3,131,213
2,6-DIMETHYL AND 2,6-DIETHYLPHENYL N-(AMINOALKYL)CARBAMATES AND ACID ADDITION SALTS THEREOF
Alexander R. Surrey, Albany, and George Y. Lesher, North Greenbush Township, Rensselaer County, N.Y., assignors to Sterling Drug Inc., New York, N.Y., a corporation of Delaware
No Drawing. Filed May 21, 1957, Ser. No. 660,456
9 Claims. (Cl. 260—479)

This invention relates to compositions of matter of the class of aryl N-aminoalkyl)carbamates, to their acid-addition salts, and to the preparation of these compounds.

The invention here resides in the concept of a composition having a molecular structure in which the novel feature is the attachment of methyl or ethyl radicals at the 2- and 6-positions of the benzene ring of a phenyl N-[lower-(tertiary- or secondary-amino)-(ethyl or propyl)] carbamate, and acid-addition salts thereof. The invention also includes a process for forming these compounds.

The novel carbamates in free base form can be represented by the following Formula I

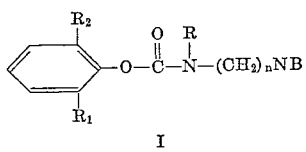

I where R represents H or $CH_3$; $R_1$ and $R_2$ can be the same or different and each represents a methyl or ethyl radical; $n$ represents the integer 2 or 3; and NB represents a lower-secondary-amino or a lower-tertiary-amino radical.

The amino radical, represented above as NB, comprehends both pharmacodynamically acceptable lower-secondary-amino and lower-tertiary-amino radicals having a total of from two to about twelve carbon atoms. NB thus comprehends such well-known lower-secondary-amino radicals illustrated by: mono-(lower-alkyl)amino radicals where the lower-alkyl group has preferably from two to six carbon atoms such radicals including ethylamino, n-propylamino, isopropylamino, n-butylamino, 2-butylamino, isobutylamino, n-amylamino, n-hexylamino, etc.; monocycloalkylamino radicals where the cycloalkyl group has preferably from three to six ring-carbon atoms such radicals including cyclopropylamino, cyclobutylamino, cyclopentylamino and cyclohexylamino; and the like. The amino radical NB likewise comprehends well-known lower-tertiary-amino radicals having two nitrogen substituents such as those illustrated above for the lower-secondary-amino radicals, with preferred tertiary-amino radicals being di-(lower-alkyl)amino radicals where the lower-alkyl radicals are alike or different and each alkyl radical has preferably from one to six carbon atoms, such dialkylamino radicals including dimethylamino, diethylamino, ethyl-methylamino, diisopropylamino, ethyl-n-propylamino, di-n-butylamino, di-n-hexylamino, and the like. Further, when designating lower-tertiary-amino radicals, NB includes the usual saturated N-heteromonocyclic radicals having five to six ring atoms, illustrated by 1-piperidyl; (lower-alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower-alkylated)-1-pyrrolidyl such as 2-methyl-1-pyrrolidyl, 3-ethyl-1-pyrrolidyl, 2,5-dimethyl-1-pyrrolidyl; 4-morpholinyl; 1-piperazyl; alkylated-1-piperazyl such as 4-methyl-1-piperazyl, 4-ethyl-1-piperazyl, 2,4,6-trimethyl-1-piperazyl; and the like.

Preferred embodiments of our invention are the 2,6-dimethylphenyl N-(2-dialkylaminoethyl)carbamates represented in free base form by the Formula II

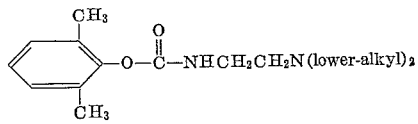

II where the lower-alkyl radicals are methyl or ethyl, in particular, 2,6-dimethylphenyl N-(2-diethylaminoethyl) carbamate and 2,6-dimethylphenyl N-(2-dimethylaminoethyl)carbamate.

The compounds of our invention have pharmacodynamic properties, in particular, local anesthetic activity. For example, 2,6 - dimethylphenyl N - (2 - diethylaminoethyl)carbamate as its hydrochloride salt when tested by the intracutaneous wheal test in guinea pigs [Bulbring and Wajda, J. Pharmacol. 85, 78 (1945)] was found to be about four times as active as procaine hydrochloride. When tested by intraspinal injection in rabbits according to the procedure described by Bieter et al. [J. Pharmacol. and Exper. Therap. 57, 221 (1936)], this compound was found to be about two and one-half times as active as procaine and no permanent paralysis was produced by the injection of a 2% aqueous solution of its hydrochloride in four rabbits. The dose-response curve of this compound has a higher slope than that of procaine, indicating that it has a longer duration of action by intraspinal route.

The compounds of our invention were prepared by reacting the chloroformate of 2,6-dimethylphenol, 2,6-diethylphenol or 2-ethyl-6-methylphenol with an ethylenediamine of the formula $RHNCH_2CH_2NB$ where R and NB have the meanings given above. This reaction is exothermic and is carried out in an inert, non-polar solvent such as benzene, toluene, ether, n-heptane, and the like, preferably with cooling.

Another aspect of our invention resides in the intermediate 2,6-dialkylphenyl chloroformates, which were prepared by reacting the 2,6-dialkylphenol with phosgene (carbonyl chloride), preferably in an inert reaction medium such as benzene in the presence of an organic tertiary-amine such as dimethylaniline which is soluble in the reaction medium but forms an insoluble hydrochloride salt.

Our new 2,6-dialkylphenyl N-(aminoethyl)carbamates are useful in the free base form or in the form of acid-addition salts, and both forms are within the purview of the invention. The acids which can be used to prepare acid-addition salts are preferably those which produce, when combined with the free base, salts whose anions are relatively innocous to an animal organism in therapeutic doses of the salts, so that the beneficial physiological properties inherent in the free base are not vitiated by side effects ascribable to the anions; in other words, the latter do not substantially affect the pharmacodynamic properties inherent in the cations. In practicing our invention, we found it convenient to employ the hydrochloride salts. However, other appropriate acid-addition salts are those derived from mineral acids such as hydrobromic acid, hydriodic acid, nitric acid, phosphoric and sulfuric acid; and organic acids such as acetic acid, citric acid, tartaric acid, lactic acid, quinic acid, methanesulfonic acid, ethanesulfonic acid, and the like, giving the hydrobromide, hydriodide, nitrate, phosphate, sulfate, acetate, citrate, tartrate, lactate, quinate, methanesulfonate and ethanesulfonate salts, respectively.

The molecular structures of our compounds are established by their mode of synthesis and corroborated by the correspondence of calculated and found values for the elementary analyses for representative examples.

The following examples will further illustrate the invention without, however, limiting it thereto.

EXAMPLE 1

A. 2,6-Dimethylphenyl Chloroformate

A solution of 65 g. of 2,6-dimethylphenol in 500 ml. of benzene was cooled in an ice bath while 105 g. of phosgene was bubbled in. Then 73 g. of N,N-dimethylaniline was added slowly with stirring and cooling; and the mixture was allowed to stand overnight. The solid (dimethylaniline HCl) that formed was filtered off. The benzene filtrate was washed with water, 1 N hydrochloric acid and again water. After drying the solution over anhydrous calcium sulfate (Drierite®), the benzene was removed by distillation, leaving 93 g. (95% yield) of 2,6-dimethylphenyl chloroformate, an oil, which was used directly in the next step, e.g., Example 1B.

Following the foregoing procedure using 2-ethyl-6-methylphenol in place of 2,6-dimethylphenol, there is obtained 2-ethyl-6-methylphenyl chloroformate.

B. 2,6-Dimethylphenyl N-(2-Diethylaminoethyl)Carbamate

A solution of 13.0 g. of 2,6-dimethylphenyl chloroformate in 40 ml. of benzene was added slowly with stirring and cooling to a solution of 16.5 g. of 2-diethylaminoethylamine in 40 ml. of benzene and the resulting reaction mixture was allowed to stand at room temperature for fifteen minutes. It was then washed with water and extracted with 1 N hydrochloric acid. The acid extract was washed with ethylene dichloride, made basic with excess 10% sodium carbonate solution, and extracted with benzene. The benzene extract was dried over anhydrous potassium carbonate and distilled in vacuo, leaving 16 g. (86% yield) of 2,6-dimethylphenyl N-(2-diethylaminoethyl)carbamate, an oil. This basic carbamate was converted into its hydrochloride salt by dissolving it in ether, treating the solution with hydrogen chloride in ethanol, collecting the precipitated salt, and recrystallizing it from isopropanol-ether, M.P. 158.0–160.0° C. (corr.).

*Analysis.*—Calcd. for $C_{15}H_{24}N_2O_2 \cdot HCl$: N, 9.32; $Cl^-$, 11.79. Found: N, 9.22; $Cl^-$, 11.66.

Pharmacological evaluation of 2,6-dimethylphenyl N-(2-diethylaminoethyl)carbamate hydrochloride in aqueous solution administered intradermally in guinea pigs according to the method of Bulbring and Wajda [J. Pharmacol. and Exptl. Therap. 85, 78 (1945)] has shown that this compound in terms of its free base is approximately four times as active a local anesthetic as procaine. 2,6-dimethylphenyl N-(2-diethylaminoethyl)carbamate hydrochloride was found to have an acute intravenous toxicity ($LD_{50}$) in mice of 12.2±0.6 mg. per kg.

Other 2,6-dialkylphenyl N-[lower-(tertiary-amino)-alkyl]carbamates that can be prepared according to the foregoing procedure used for the preparation of 2,6-dimethylphenyl N-(2-diethylaminoethyl)carbamate using the appropriate reactants are: 2-ethyl-6-methylphenyl N-(2-diethylaminoethyl)carbamate by reacting 2-ethyl-6-methylphenyl chloroformate with 2-diethylamino-ethylamine; 2,6-dimethylphenyl N-[2-(ethyl-methylamino)-ethyl]carbamate by reacting 2,6-dimethylphenyl chloroformate with 2-(ethyl-methylamino)ethylamine; 2,6-dimethylphenyl N-[2-(n-propyl-methylamino)ethyl]-carbamate by reacting 2,6-dimethylphenyl chloroformate with 2-(n-propyl-methylamino)ethylamine; 2,6-dimethylphenyl N-(2-di-n-hexylaminoethyl)carbamate by reacting 2,6-dimethylphenyl chloroformate with 2-di-n-hexylaminoethylamine; 2,6-dimethylphenyl N-[2-(N'-cyclopropyl-N'-methylamino)ethyl]carbamate by reacting 2,6-dimethylphenyl chloroformate with 2-(N'-cyclopropyl)-N'-methylamino)ethylamine; 2,6-dimethylphenyl N-[2-(1-piperidyl)ethyl]carbamate by reacting 2,6-dimethylphenyl chloroformate with 2-(1-piperidyl)ethylamine; 2,6-diethylphenyl N-[3-(1-pyrrolidyl)propyl]carbamate by reacting 2,6-diethylphenyl chloroformate with 3-(1-pyrrolidyl)propylamine; 2,6-dimethylphenyl N-[2-(2-methyl-1-piperidyl)ethyl]carbamate by reacting 2,6-dimethylphenyl chloroformate with 2-(2-methyl-1-piperidyl)ethylamine; 2,6-dimethylphenyl N-[2-(2,5-dimethyl-1-pyrrolidyl)ethyl]carbamate by reacting 2,6-dimethylphenyl chloroformate with 2-(2,5-dimethyl-1-pyrrolidyl)ethylamine; 2,6-dimethylphenyl N-[2-(4-methyl-1-piperazyl)ethyl]carbamate by reacting 2,6-dimethylphenyl chloroformate with 2-(4-methyl-1-piperazyl)ethylamine; 2,6-dimethylphenyl N-[2-(4-morpholinyl)ethyl]carbamate by reacting 2,6-dimethylphenyl chloroformate with 2,(4-morpholinyl)ethylamine; and the like. These basic carbamates can be isolated in free base form or in the form of their acid-addition salts, preferably the hydrochlorides.

EXAMPLE 2

2,6-Dimethylphenyl N-(2-Dimethylaminoethyl)Carbamate

This preparation was carried out following the procedure given in Example 1B using 13 g. of 2,6-dimethylphenyl chloroformate and 8.8 g. of 2-dimethylaminoethylamine. There was thus obtained 10 g. (73% yield) of 2,6-dimethylphenyl N-(2-dimethylaminoethyl)carbamate; the hydrochloride melted at 146.2–147.6° C. (corr.) when recrystallized from acetone.

*Analysis.*—Calcd. for $C_{13}H_{20}N_2O_2 \cdot HCl$: C, 57.32; H, 7.39; $Cl^-$, 13.00. Found: C, 57.00; H, 7.57; $Cl^-$, 12.82.

Pharmacological evaluation of 2,6-dimethylphenyl N-(2-dimethylaminoethyl)carbamate hydrochloride in aqueous solution administered intradermally in guinea pigs according to the method of Bulbring and Wajda, ibid., has shown that this compound in terms of its free base is approximately two and one-half times as active a local anesthetic as procaine. 2,6-dimethylphenyl N-(2-dimethylaminoethyl)carbamate hydrochloride was found to have an acute intravenous toxicity ($LD_{50}$) in mice of 22.5±1.3 mg. per kg.

EXAMPLE 3

A. 2,6-Diethylphenyl Chloroformate

This compound was prepared following the procedure given in Example 1A using 28 g. of 2,6-diethylphenol, 200 ml. of benzene, 30 g. of phosgene and 24 g. of N,N-dimethylaniline. There was obtained 38 g. (96% yield) of 2,6-diethylphenyl chloroformate, an oil.

B. 2,6-Diethylphenyl N-(2-Dimethylaminoethyl)-Carbamate

Following the procedure given in Example 1B using 10.6 g. of 2,6-diethylphenyl chloroformate and 8.8 g. of 2-dimethylaminoethylamine, there was obtained 9 g. (68% yield) of 2,6-diethylphenyl N-(2-dimethylaminoethyl)carbamate; the hydrochloride melted at 148.4–150.4° C. (corr.) when recrystallized from isopropanol-isopropyl ether.

*Analysis.*—Calcd. for $C_{15}H_{24}N_2O_2 \cdot HCl$: N, 9.31; $Cl^-$, 11.79. Found: N, 9.17; $Cl^-$, 11.65.

Pharmacological evaluation of 2,6-diethylphenyl N-(2-dimethylaminoethyl)carbamate hydrochloride in aqueous solution administered intradermally in guinea pigs according to the method of Bulbring and Wajda, ibid., has shown that this compound in terms of its free base is approximately four times as active a local anesthetic as procaine. 2,6-diethylphenyl N-(2-dimethylaminoethyl)-carbamate hydrochloride was found to have an acute intravenous toxicity ($LD_{50}$) in mice of 36.5±2.2 mg. per kg.

Following the above procedure using the equivalent quantity of 2-diethylaminoethylamine in place of 2-dimethylaminoethylamine, the product obtained is 2,6-diethylphenyl N-(2-diethylaminoethyl)carbamate hydrochloride.

EXAMPLE 4

*2,6-Dimethylphenyl N-(2-n-Propylaminoethyl)-Carbamate*

Following the procedure described in Example 1B using 9.2 g. of 2,6-dimethylphenyl chloroformate and 10.2 g. of 2-n-propylaminoethylamine, there was obtained 3.5 g. (27% yield) of 2,6-dimethylphenyl N-(2-n-propylaminoethyl)carbamate; the hydrochloride melted at 198.6–200.0° C. (corr.) when recrystallized from isopropanol.

*Analysis.*—Calcd. for $C_{14}H_{22}N_2O_2 \cdot HCl$: N, 9.76; $Cl^-$, 12.38. Found: N, 9.71; $Cl^-$, 12.35.

Pharmacological evaluation of 2,6-dimethylphenyl N-(2-n-propylaminoethyl)carbamate hydrochloride in aqueous solution administered intradermally in guinea pigs according to the method of Bulbring and Wajda, ibid., has shown that this compound in terms of its free base is approximately four times as active a local anesthetic as procaine. 2,6-dimethylphenyl N-(2-n-propylaminoethyl)carbamate hydrochloride was found to have an acute intravenous toxicity ($LD_{50}$) in mice of 19±1.4 mg. per kg.

Other 2,6-dialkylphenyl N-[lower-(secondary-amino)-alkyl]carbamates that can be prepared according to the foregoing procedure used for the preparation of 2,6-dimethylphenyl N-(2-n-propylaminoethyl)carbamate using the appropriate reactants are: 2,6-diethylphenyl N-(2-ethylaminoethyl)carbamate by reacting 2,6-diethylphenyl chloroformate with 2-ethylaminoethylamine; 2,6-dimethylphenyl N-(2-isobutylaminoethyl)carbamate by reacting 2,6-dimethylphenyl chloroformate with 2-isobutylaminoethylamine; 2,6-dimethylphenyl N-(2-n-butylaminoethyl)carbamate by reacting 2,6-dimethylphenyl chloroformate with 2-n-butylaminoethylamine; 2,6-dimethylphenyl N-(2-cyclohexylaminoethyl)carbamate by reacting 2,6-dimethylphenyl chloroformate with 2-cyclohexylaminoethylamine; 2-ethyl-6-methylphenyl N-(3-isopropylaminopropyl)carbamate by reacting 2-ethyl-6-methylphenyl chloroformate with 3-isopropylaminopropylamine; 2,6-dimethylphenyl N-(3-cyclopropylaminopropyl)carbamate by reacting 2,6-dimethylphenyl chloroformate with 3-cyclopropylaminopropylamine; and the like. These basic carbamates can be isolated in free base form or in the form of their acid-addition salts, preferably the hydrochlorides.

EXAMPLE 5

*2,6-Dimethylphenyl N-(2-Diethylaminoethyl)-N-Methylcarbamate*

This compound was prepared following the procedure described in Example 1B using 9.2 g. of 2,6-dimethylphenylcarbamate and 13.0 g. of N,N-diethyl-N'-methylethylenediamine. There was thus obtained 13 g. (92.5% yield) of 2,6-dimethylphenyl N-(2-diethylaminoethyl)-N-methylcarbamate; the hydrochloride melted at 126.0–128.4° C. (corr.) when recrystallized from acetone-ether.

*Analysis.*—Calcd. for $C_{16}H_{26}N_2O_2 \cdot HCl$: N, 8.90; $Cl^-$, 11.25. Found: N, 8.83; $Cl^-$, 11.27.

Pharmacological evaluation of 2,6-dimethylphenyl N-(2-diethylaminoethyl)-N-methylcarbamate hydrochloride in aqueous solution administered intradermally in guinea pigs according to the method of Bulbring and Wajda, ibid., has shown that this compound in terms of its free base is approximately two times as active a local anesthetic as procaine. 2,6-dimethylphenyl N-(2-diethylaminoethyl)-N-methylcarbamate hydrochloride was found to have an acute intravenous toxicity ($LD_{50}$) in mice of 17±1 mg. per kg.

EXAMPLE 6

*2,6-Dimethylphenyl N-(3-Dimethylaminopropyl)-Carbamate*

This compound was prepared following the procedure described in Example 1B using 13 g. of 2,6-dimethylphenyl chloroformate and 18.3 g. of 3-dimethylaminopropylamine. There was thus obtained 12 g. (62% yield) of 2,6-dimethylphenyl N-(3-dimethylaminopropyl)carbamate; the hydrochloride melted at 131.4–135.6° C. (corr.) when recrystallized from isopropanol-isopropyl ether.

*Analysis.*—Calcd. for $C_{14}H_{22}N_2O_2 \cdot HCl$: C, 58.63; H, 8.08; N, 9.77; $Cl^-$, 12.36. Found: C, 58.73; H, 8.04; N, 9.46; $Cl^-$, 12.29.

Pharmacological evaluation of 2,6-dimethylphenyl N-(3-dimethylaminopropyl)carbamate hydrochloride in aqueous solution administered intradermally in guinea pigs according to the method of Bulbring and Wajda, ibid., has shown that this compound in terms of its free base is approximately two times as active a local anesthetic as procaine. 2,6-dimethylphenyl N-(3-dimethylaminopropyl)carbamate hydrochloride was found to have an acute intravenous toxicity ($LD_{50}$) in mice of 33.5±2.3 mg. per kg.

EXAMPLE 7

*2,6-Diethylphenyl-N-(3-Dimethylaminopropyl)-Carbamate*

Following the procedure described in Example 1B using 5.5 g. of 2,6-diethylphenyl chloroformate and 5.1 g. of 3-dimethylaminopropylamine, there was obtained 5.5 g. (79% yield) of 2,6-diethylphenyl N-(3-dimethylaminopropyl)carbamate; the hydrochloride melted at 142.2–146.2° C. (corr.) when recrystallized from isopropanol-isopropyl ether.

*Analysis.*—Calcd. for $C_{16}H_{26}N_2O_2 \cdot HCl$: N, 8.90; $Cl^-$, 11.27. Found: N, 8.81; $Cl^-$, 11.46.

Pharmacological evaluation of 2,6-diethylphenyl N-(3-dimethylaminopropyl)carbamate hydrochloride in aqueous solution administered intradermally in guinea pigs according to the method of Bulbring and Wajda, ibid., has shown that this compound in terms of its free base is approximately twenty percent more active a local anesthetic than procaine. 2,6-diethylphenyl N-(3-dimethylaminopropyl)carbamate hydrochloride was found to have an acute intravenous toxicity ($LD_{50}$) in mice of 32±3 mg. per kg.

EXAMPLE 8

*2,6-Diethylphenyl N-(3-Diethylaminopropyl)Carbamate*

Following the procedure given in Example 1B using 10.6 g. of 2,6-diethylphenyl chloroformate and 13 g. of 3-diethylaminopropylamine, there was obtained 13 g. (85% yield) of 2,6-diethylphenyl N-(3-diethylaminopropyl)carbamate; the hydrochloride melted at 97.0–99.8° C. (corr.) when recrystallized from isopropanol-isopropyl ether.

*Analysis.*—Calcd. for $C_{18}H_{30}N_2O_2 \cdot HCl$: N, 8.17; $Cl^-$, 10.34. Found: N, 8.14; $Cl^-$, 10.24.

Pharmacological evaluation of 2,6-diethylphenyl N-(3-diethylaminopropyl)carbamate hydrochloride in aqueous solution administered intradermally in guinea pigs according to the method of Bulbring and Wajda, ibid., has shown that this compound in terms of its free base is approximately three times as active a local anesthetic as procaine. 2,6-diethylphenyl N-(3-diethylaminopropyl)carbamate hydrochloride was found to have an acute intravenous toxicity in mice of 8.4±0.5 mg. per kg.

Local anesthetic compositions can be formulated using the novel 2,6-dialkylphenyl N-[lower--(tertiary- or secondary-amino)-(ethyl or propyl)]carbamates and their acid-addition salts disclosed herein together with excipients. By an excipient we mean any inert substance used to give the compositions a suitable form or consistency. In the case of liquid compositions for topical or injectable administration, the excipient is sterile water, optionally containing additional compatible ingredients for stabilizing and the like purposes such as methyl para-hydroxybenzoate, chlorobutanol, sodium bisulfite, sodium chloride, dextrose, inositol, etc., or containing other pharmacodynamically active ingredients such as a vasoconstrictor agent, e.g., epinephrine, phenylephrine. In the case of ointment or cream compositions for topical application, the excipient is preferably petrolatum, optionally containing additional compatible ingredients such as lanolin, mineral oil, white wax, wool fat, etc. Illustrative of such local anesthetic compositions of our invention are the following: an injectable aqueous preparation comprising in each cubic centimeter 10 mg. of 2,6-dimethylphenyl N-(2-diethylaminoethyl)carbamate hydrochloride, 7 mg. of sodium chloride and 1 mg. of methyl para-hydroxybenzoate; an injectable aqueous preparation comprising in each cubic centimeter 20 mg. of 2,6-dimethylphenyl N-(2-dimethylaminoethyl)carbamate hydrochloride, 0.01 mg. of epinephrine hydrochloride, 6 mg. of sodium hydrochloride and 1 mg. of methyl para-hydroxybenzoate; a topical aqueous composition comprising 10 mg. of 2,6-dimethylphenyl N-(2-diethylaminoethyl)carbamate hydrochloride, 4 mg. of chlorobutanol and enough distilled water to make 1 cc. of solution; an ointment comprising 1% of 2,6-dimethylphenyl N-(2-diethylaminoethyl)carbamate dissolved in white petrolatum.

We claim:

1. A composition of matter selected from the group consisting of: a compound having the structural formula

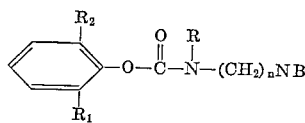

where R is selected from the group consisting of H and $CH_3$, $R_1$ and $R_2$ each represents a member of the group consisting of methyl and ethyl radicals, $n$ represents an integer from 2 to 3 inclusive, and NB is a radical containing from two to twelve carbon atoms and selected from the group consisting of mono-(lower-alkyl)amino, mono-cycloalkylamino, di-(lower-alkyl)amino, 1 - piperidyl, (lower-alkylated) - 1 - piperidyl, 1-pyrrolidyl, (lower alkylated) - 1 - pyrrolidyl, 4-morpholinyl, 1-piperazyl and alkylated-1-piperazyl radicals; and, its pharmacologically acceptable acid-addition salts.

2. A 2,6-dimethylphenyl N-(2-dialkylaminoethyl)-carbamate having the structural formula

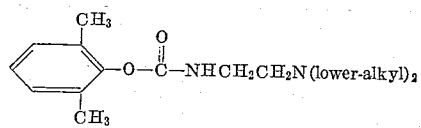

where each lower-alkyl radical is a member of the group consisting of methyl and ethyl.

3. A pharmacologically acceptable acid-addition salt of the compound of claim 2.

4. A 2,6-dimethylphenyl N-(2-monoalkylaminoethyl)-carbamate having the structural formula

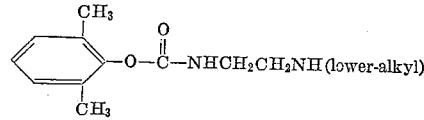

where the lower-alkyl radical has from two to four carbon atoms.

5. A pharmacologically acceptable acid-addition salt of the compound of claim 4.

6. 2,6-dimethylphenyl N-(2-dimethylaminoethyl)carbamate.

7. 2,6 dimethylphenyl N-(2-dimethylaminoethyl)carbamate hydrochloride.

8. 2,6-dimethylphenyl N-(2 - diethylaminoethyl)carbamate.

9. 2,6-dimethylphenyl N-(2 - diethylaminoethyl)carbamate hydrochloride.

References Cited in the file of this patent

UNITED STATES PATENTS

| | | |
|---|---|---|
| 2,370,570 | Muskat | Feb. 27, 1945 |
| 2,397,631 | Strain | Apr. 2, 1946 |
| 2,464,056 | Pechukas | Mar. 8, 1949 |
| 2,524,185 | Zima et al. | Oct. 3, 1950 |
| 2,675,403 | Cupery | Apr. 13, 1954 |
| 2,683,735 | Cusic | July 13, 1954 |

OTHER REFERENCES

Beilstein, 4th Ed., vol. 6, p. 487 (1923).